Dec. 16, 1947.    C. F. KETTERING ET AL    2,432,667
AUTOMATIC CONTROL
Original Filed Aug. 3, 1942    2 Sheets-Sheet 1
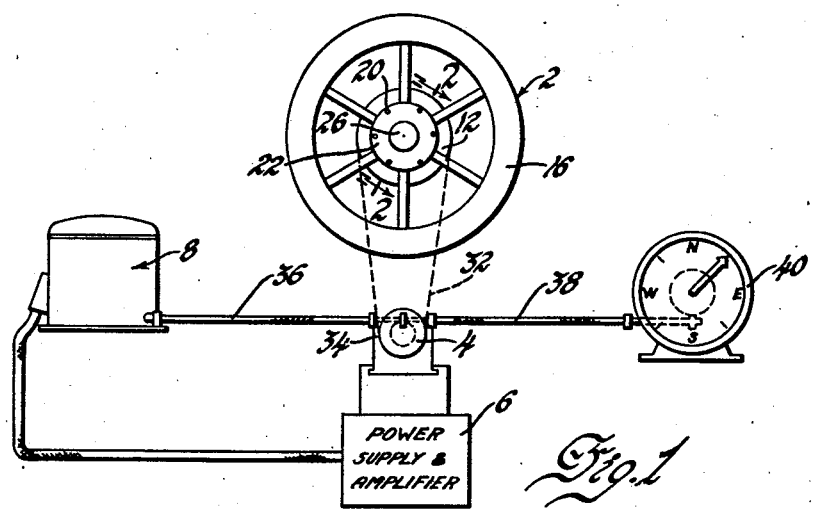
Fig. 1
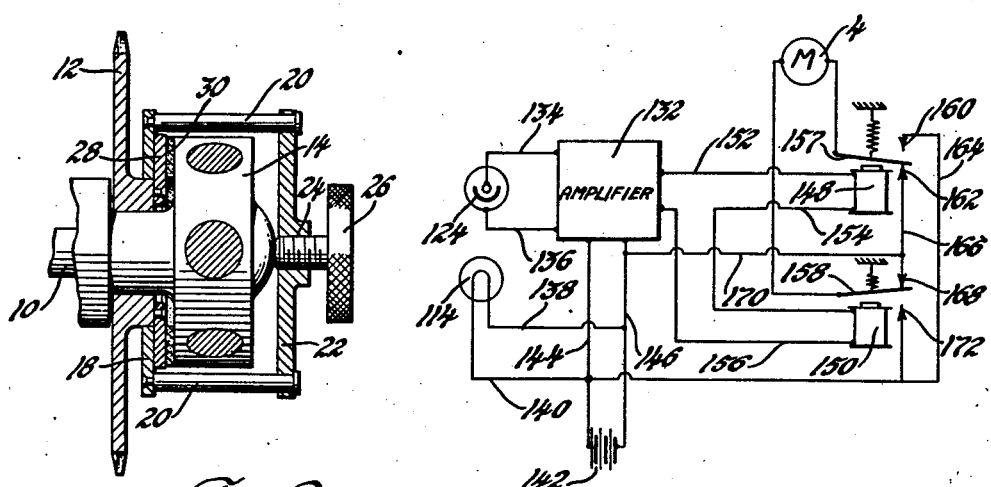
Fig. 2
Fig. 3
Inventors
Charles F. Kettering &
Osbert W. Fischer
By Blackmore, Spencer & Oliver
Attorneys Dec. 16, 1947.    C. F. KETTERING ET AL    2,432,667
AUTOMATIC CONTROL
Original Filed Aug. 3, 1942    2 Sheets-Sheet 2

Inventors
Charles F. Kettering &
Albert W. Fischer
By Blackmore, Sewer & Ulick
Attorneys

UNITED STATES PATENT OFFICE 2,432,667

AUTOMATIC CONTROL

Charles F. Kettering and Albert W. Fischer, Detroit, Mich., assignors to General Motors Corporation, Detroit, Mich., a corporation of Delaware Original application August 3, 1942, Serial No. 453,357. Divided and this application November 2, 1944, Serial No. 561,560

7 Claims. (Cl. 250—41.5)

This invention relates to automatic control means and more specifically to means to automatically maintain a mobile body on a predetermined or set course. In the operation of mobile craft, such as ships or airplanes, it is very desirable to have thereon means which may be set to hold a course and to have this means automatically maintain such course for a period of time. By some means, such as the above, the operators or pilots thereof are relieved of much tedious duty or such automatically controlled craft may be preset and dispatched with no personnel on board and will reach its objective as in the case of a torpedo. This application is a division of our Patent 2,377,698, issued June 5, 1945.

It is therefore an object of our invention to provide means that will automatically maintain a self-propelled body on a predetermined set course.

It is a further object of our invention to provide automatic steering means which requires no attention after it has been set.

It is a still further object of our invention to provide automatic steering means that is simple and rugged.

With these and other objects in view which will become apparent as the specification proceeds, our invention will be best understood by reference to the following specification and claims and the illustrations in the accompanying drawings, in which:

Figure 1 is a schematic view showing the essential parts of our control system;

Figure 2 is an enlarged sectional view taken on line 2—2 of Figure 1;

Figure 3 is a circuit diagram of the electrical connections of our invention;

Figure 4:
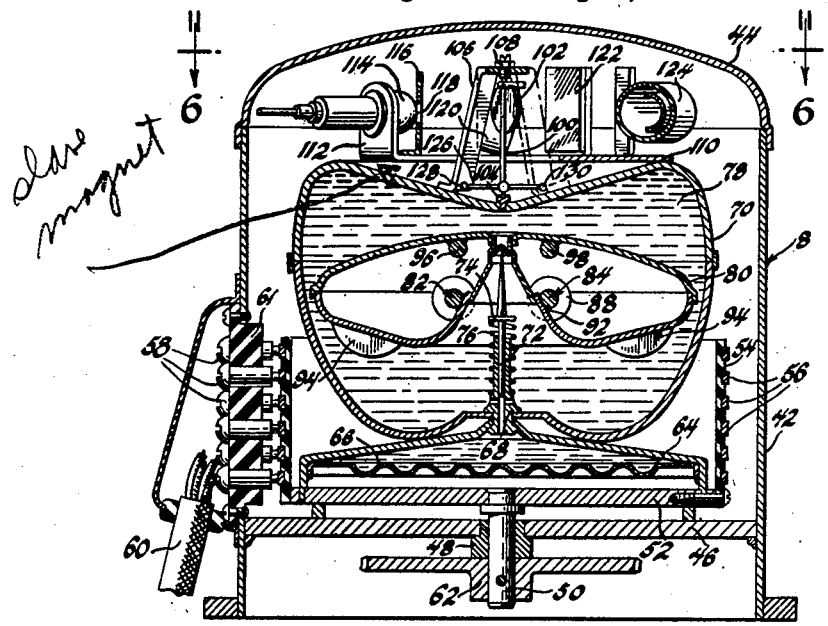
Figure 4 is an enlarged vertical section through the compass unit.
Figure 5:
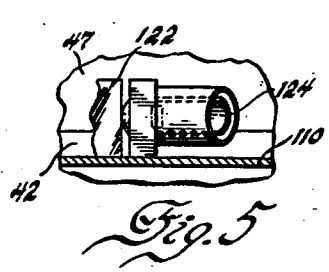
Figure 5 is a sectional view taken substantially on line 5—5 of Figure 6.
Figure 6:
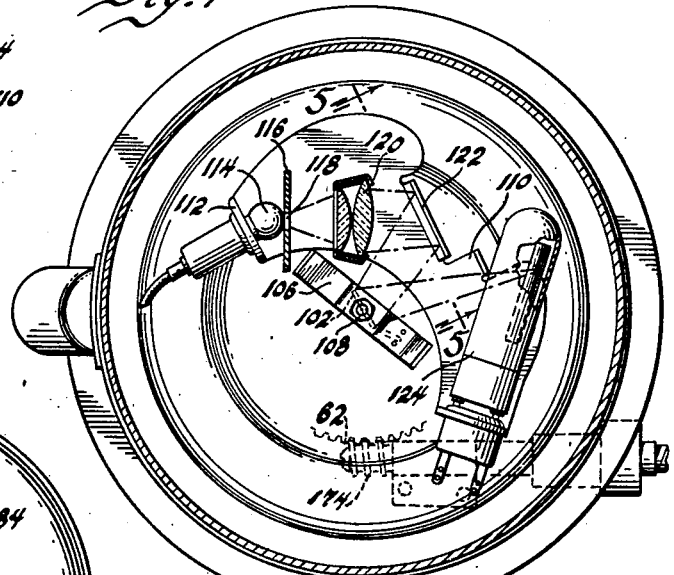
Figure 6 is a horizontal section taken on line 6—6 of Figure 4.
Figure 7:
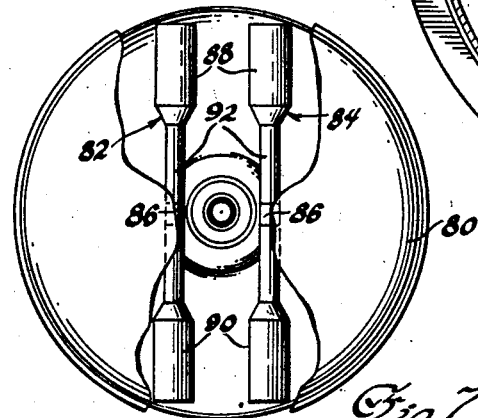
Figure 7 is a top detailed view of the master compass magnets and their mounting.

Referring now more specifically to the drawings, there is shown in Figure 1 steering mechanism indicated generally at 2 for operating the rudder of a self-propelled craft such as a boat or plane. A driving motor 4 is utilized to physically turn the steering mechanism and thus the rudder to predetermined points and this motor is a small reversible one which is supplied by power from a suitable power source 6 which in Figure 1 also houses necessary amplifying apparatus. The means for maintaining the steering mechanism and the rudder in the necessary positions is primarily a compass unit indicated generally at 8 which through means to be described controls the motor 4 to set the rudder.

The particular steering mechanism in this instance is disclosed for purposes of illustration only as being a steering wheel of a boat which wheel is mounted upon a shaft 10 connected to the steering mechanism or rudder by suitable means not shown. This shaft 10 carries a sprocket wheel 12 loosely mounted on the shaft inside of the head 14 of the steering wheel per se 16. A collar 18 fitting inside the steering wheel and surrounding the hub of the sprocket 12 is mounted on the steering wheel through spaced peripheral pins 20 connected to a disc 22 on the outer face of the steering wheel. This disc 22 has a central opening 24 therein which is internally threaded and through which a thumb screw 26 is inserted to press against the hub of the steering wheel to cause the assembly to be pulled outwardly.

To the face of the hub of the sprocket 12 is positively secured by rivets a ring 28 and to the inner face of the steering wheel and in alignment with the ring 28 is rigidly secured a collar 30 of friction material such as brake lining. Thus when the screw 26 is manually forced against the hub of the wheel, the collar 18 is pulled outwardly and locks the ring 28 against the friction material 30 so that the sprocket wheel 12 will rotate with the steering wheel at all times. This is necessary to allow at certain intervals relative motion between the wheel and sprocket so that adjustments may be made.

A driving chain 32 indicated by the dotted lines in Figure 1 is fed over the sprocket 12 and also over a second sprocket 34 on the motor shaft, whereby as the motor turns, the steering wheel and rudder will also be turned or adjusted. A plurality of flexible drive means are also driven by the motor 4, one of which comprises a Bowden wire connection 38 between the motor and an indicating member 40. Thus as the motor 4 rotates, such rotation will actuate the indicating apparatus 40 to inform the operator as to the course upon which the control is set and which will be followed. At the same time a follow-up mechanism for the compass is operated through flexible drive 36.

The compass mechanism per se which has been indicated generally at 8 consists of a substantially cylindrical housing 42 which is covered by a cap 44. A supporting cross panel 46 is provided in the base of the cylindrical member and is permanently fixed therein. This base has a central aperture therein in which is mounted a bushing 48 through which a short stub shaft 50 projects. Mounted upon the inner or upward end of the shaft 50 is a disc member 52 of only slightly smaller diameter than the casing. This disc carries about its periphery a drum 54 formed of insulating material and in the exterior surface of this drum are carried spaced conductive rings 56 providing sliding contactors for a series of spring biased terminals 58 which cooperate therewith, said terminals 58 being connected to individual wires provided in a connecting cable 60 which conducts them back to the power supply and amplifier. Thus as the stub shaft 50 turns, all of the mechanism carried thereby will also have its angular position altered. The terminals 58 are carried in the side of a casing by an insulating block 61 and have portions bearing against the surface of these circular conductive inserts in the insulating drum 54. Thus any power from other parts of the apparatus is conducted to mechanism carried by the rotating means through the terminals and conductive rings.

On the lower end of the stub shaft 50 there is secured a gear 62 which is connected to the rotating shaft 50 and engages the gear driven by the Bowden wire means 36 and is therefore driven by the motor 4 in its rotation. Secured to the upper face of the disc 52 is a flanged bell member 64 which has stretched across its inner portion a corrugated diaphragm member 66 to seal the same from the atmosphere. The central portion of this bell at the top is provided with an opening through which a hollow bushing 68 passes, said hollow bushing securing a large hollow spherical body 70 thereto. In the hollow section of the upper portion of the bushing 68 is inserted one end of a tapered rod 72. On this rod at substantially the midpoint thereof is fastened a disc 74 and a concentric coil spring 76 is mounted around the rod bearing against the disc 74 and a shoulder on the outer surface of the bushing 68. This tends to eject the rod from the bushing or force it upwardly as shown in Figure 4 to provide a spring mounting for means to be described.

The spherical member 70 and the interconnected enclosure formed by the bell member 64 and diaphragm 66 which forms an auxiliary expansion chamber are adapted to be filled with a fluid 78 and in this fluid bath and pivotally mounted upon the upper end of the tapered rod 72 is a hollow circular member 80. The circular member 80 has a concave conical opening in the bottom surface into the extremity of which the tip of the tapered rod 72 projects and upon which the member 80 is balanced on this pivot point. The member 80 is sealed and therefore maintains air therein and carries on the inner surface of the conical portion a pair of spaced parallel magnets 82 and 84 which are clamped thereto by small collars 86. These two magnets are built up of Alnico portions 88 and 90 separated by a soft iron spaced 92 to form north and south poles.

The float or member 80 is submerged in the liquid 78 to buoy up approximately 90% of the weight of the magnet assembly and the taper on the conical reentrant opening in the bottom face of the assembly is designed so that the float may pivot 30° in any direction from vertical. Vanes 94 are provided upon the outer surface of the member 80 to furnish damping for movements of the magnet housing. The two magnets 82 and 84 are parallel and when placed in the earth's magnetic field tend to align themselves and the float therewith to indicate direction. Spaced above each of the master magnets 82 and 84 and aligned therewith are two auxiliary magnets 96 and 98 which are supported from the inner surface of the float 80 and are directly above the other two magnets.

The upper surface of the substantially spherical member 70 is depressed to form a hollow portion and in the center of this hollow portion there is pivotally mounted a small vertical rod 100 which carries thereon a mirror 102. A transverse bar 126 is centrally affixed to the vertical rod 100 and carries at its outer extremities two small slave magnets 128 and 130 whose position is controlled by the larger magnets and which do the actual turning of the mirror for control purposes. The lower end of this rod is pivoted at 104 which is the center of the depressed portion and a bracket 106 connected to the upper surface of the member 70 carries the upper pivot 108 which is adjustable to allow the shaft to be clamped firmly but to pivot freely in its two aligned pivots.

A small platform 110 is also carried by the upper surface of the member 70 and an upturned flange 112 carries a light 114, the rays from which project through a panel 116 having an opening 118 therein. These light rays fall upon a pair of lenses 120 which project them onto a reflecting surface 122 which surface is concave and converges the rays upon the adjustable mirror 102 whose position is determined by the compass means. The rays are then caused to fall upon a photoelectric cell 124 or similar light sensitive device, the output of which is fed through the terminals to the amplifier. Thus the position of the mirror 102, as determined by the magnets or compass needles, determines the amount of light falling on the photoelectric cell and the output thereof which is amplified determines the operation of the control motor.

Referring now more specifically to Figure 3, there is shown therein the photoelectric cell 124 which is connected to an amplifier 132 by suitable lines 134 and 136. The light source or bulb 114 is connected across the power source by lines 138 and 140. A battery 142 provides the energy for the system and is connected to the amplifier by lines 144 and 146. The output of the amplifier is connected to two relays 148 and 150 in series by lines 152, 154 and 156. Relay 148 operates an armature 157 and relay 150 operates an armature 158. When the relays are energized, the armatures are in their lower position, and when deenergized, in their upper position. Both armatures are spring biased to their inoperative or deenergized position, but the spring bias on armature on 157 is always less than that on armature 158 and therefore with the same current flowing through both relays, armature 157 will be attracted previous to 158.

Armature 157 oscillates between two contacts 160 and 162, the first of which is connected by line 164 to one side of the battery 142 and the second of which is connected by line 166 to contact 168 of the lower armature 158 and also by line 170 to line 146. The lower contact 172 of the lower armature 158 is connected to line 164 and thus to the battery. The two armatures 157 and 158 are directly connected electrically to the driving motor 4 of the device.

In operation thereof the compass and indicator are set for a particular course and are adjusted with respect to the steering wheel by unlocking the friction arrangement described and shown in Figure 2 and when they have been set on the course the thumb screw 26 is locked. The device or craft is then started upon its course and the amounts of deviation from said course vary the position of the magnet compass members 82 and 84 and their float with respect to the substantially spherical housing 70. This causes the slave magnets 128 and 130 to move the mirror about its pivot and therefore vary the amount of light thrown on the photoelectric cell.

The output of said photoelectric cell is fed through the amplifier and applied to the two relays 148 and 150 in series. If the craft has not deviated sufficiently from its course in one direction to warrant correction, the amount of current flowing in the relay circuits will be insufficient to cause them to be attracted and they will therefore have their armatures in their upper position and the motor 4 continues to be energized to turn in one direction through the following circuit: battery 142, line 144, line 164, contact 160, armature 156, motor 4, armature 158, contact 168, line 170, line 146, back to the battery 142. This will cause the rudder to turn in one direction.

However, when a sufficient correction or movement of the rudder in one direction has been obtained, the light on the photoelectric cell will become more and more intense and the current flowing in the relay circuits will increase until such time as relay 148 has a sufficient current to attract its armature 157. This will break the motor circuit, and since at this instant armature 158 is still up, no current will flow through the motor. The rudder will then remain in the position set which will probably be to cause the boat to turn further off course and when the light intensity increases still further, the relay 150 will be sufficiently energized to attract its armature 158 and both armatures 157 and 158 will now be in their lower or energized position and the motor 4 will be caused to rotate in the opposite direction to that previously described and the rudder will be moved back to cause a correction in the opposite direction.

It will therefore be obvious that the control mechanism will cause the motor to move the rudder first slightly in one direction and then slightly in the opposite direction, but this is not strictly a "hunting" system because there is a period when one relay attracts its armature and the other does not when the motor has a deenergized or off condition. As before stated, when the motor 4 operates it drives the indicator 40 through a flexible cable drive, and simultaneously through the flexible cable drive 36 causes a worm 174 to turn the gear 62 as a follow-up mechanism to adjust the position of the main portion of the compass means to decrease the variation or amount of correction applied thereby.

We claim:

1. In control means, a hollow body, magnetic means sensitive to the earth's magnetic field pivotally mounted within said hollow body, a source of light and a light sensitive cell mounted in spaced relation on said hollow body, light interrupting means pivotally mounted exteriorly of said hollow body to control the flow of light from the source to the cell and slave magnet means secured to said last named pivotal means to duplicate the movement of the first named magnetic means and control the energization of said cell in relation to the position of the magnetic means.

2. In control means, a hollow body, magnetic means sensitive to the earth's magnetic field pivotally mounted within said hollow body, a source of light and a light sensitive cell mounted in spaced relation on said hollow body, a series of reflecting means mounted exteriorly of said hollow body between the source and the cell to direct the light rays upon the cell, pivotal mounting means for a part of the reflecting means to vary the intensity of light falling on said cell and slave magnet means rigidly connected to the pivoted means influenced by the first named magnetic means to control the position of said pivoted means and the proportionate amount of light falling on said cell as dictated by the position of the first named magnetic means.

3. In control apparatus, a housing, a hollow body adjustably mounted within the housing, a float pivotally mounted within the hollow body, liquid filling the space within the hollow body and buoying up the float, magnetic means carried within the float, second magnetic means pivotally carried by the hollow body in juxtaposition to the float whereby the two magnetic means will align themselves, a source of light carried on the hollow body, light sensitive means also carried on the hollow body and means on the pivotal mounting exteriorly of the hollow body for the second magnetic means to vary the amount of light from the source that falls on the light sensitive means whereby the position of the first magnetic means controls the amount of light falling on the light sensitive means and thus the output of the means.

4. In control apparatus, a housing, a hollow body adjustably mounted within said housing, fluid filling said hollow body, a float pivotally mounted within said hollow body and buoyed up by said fluid, magnetic means carried by said float, a second magnetic means pivotally carried exteriorly of said hollow body in juxtaposition to said float whereby the magnetic means will align themselves, a source of light carried on said hollow body, a light sensitive means carried on said hollow body, means operated by movement of the second magnetic means to vary the amount of light on the light sensitive means and slidable electrical contactor means to conduct current to and from the adjustable hollow body.

5. In control apparatus, a horizontally disposed magnet rigidly mounted on a vertical spindle having freedom of rotary motion in a horizontal plane, a source of light, a light sensitive means, a light reflecting means mounted in a vertical plane substantially on the axis of rotation of and carried by said magnet, said light source and said light sensitive means so positioned that rays from the light source are reflected by the reflecting means to vary the light falling on the light sensitive means and thus control the electrical output of said light sensitive means.

6. In control apparatus, a hollow body, a magnetic means sensitive to the earth's magnetic field pivotally mounted in said hollow body, said magnetic means mounted by suspension means above its center of gravity with unlimited movement in the horizontal plane and limited movement in the vertical plane, a second magnetic means pivotally carried by said hollow body in juxtaposition with said first magnetic means whereby said magnetic means will align themselves, a source of light carried on said hollow body, a light sensitive means carried on said hollow body, means operated by movement of the second magnetic means to vary the amount of light on the light sensitive means and thereby control the electrical output of said light sensitive means, 7. In an electrical control device, a light sensitive means, and a light source mounted in fixed relation to each other, a magnetic means sensitive to the earth's magnetic field mounted free to move in a plurality of planes relative to said first mentioned means, a second magnetic means with freedom of movement in only one plane controlled by the magnetic field of said first magnetic means, a light reflecting surface rigidly carried by said second magnetic means so positioned and associated with said light source and light sensitive means to control the amount of light falling on said light sensitive means from said light source.

CHARLES F. KETTERING.
ALBERT W. FISCHER.

REFERENCES CITED

The following references are of record in the file of this patent:

UNITED STATES PATENTS

| Number | Name | Date |
| --- | --- | --- |
| 1,819,439 | Peterson | Aug. 18, 1931 |
| 2,289,242 | Chance et al. | July 7, 1942 |
| 1,779,991 | Sperry | Oct. 28, 1930 |
| 2,112,490 | Hill | Mar. 29, 1938 |
| 1,818,103 | Sperry | Aug. 11, 1931 |
| 2,377,698 | Kettering | June 5, 1945 |
| 2,112,504 | Mirfield | Mar. 29, 1938 |
| 1,885,098 | Hill | Oct. 25, 1932 |